Feb. 9, 1965  C. F. REED  3,168,875
JET SUSPENSION
Filed April 18, 1963  3 Sheets-Sheet 1
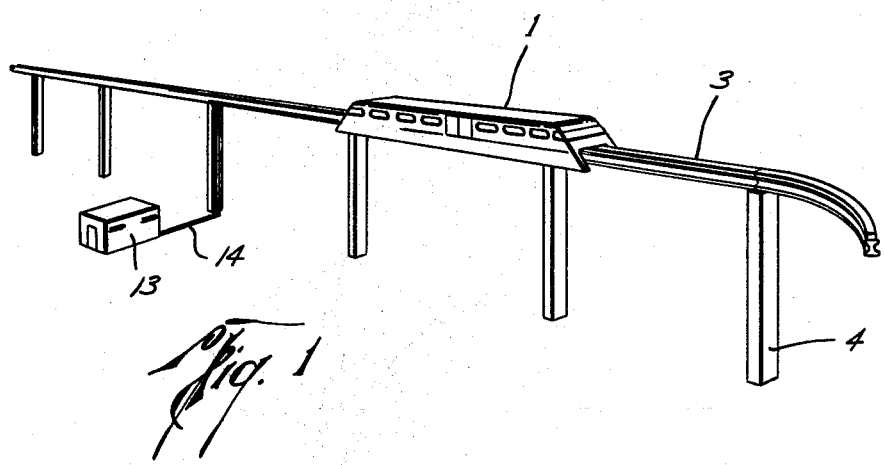
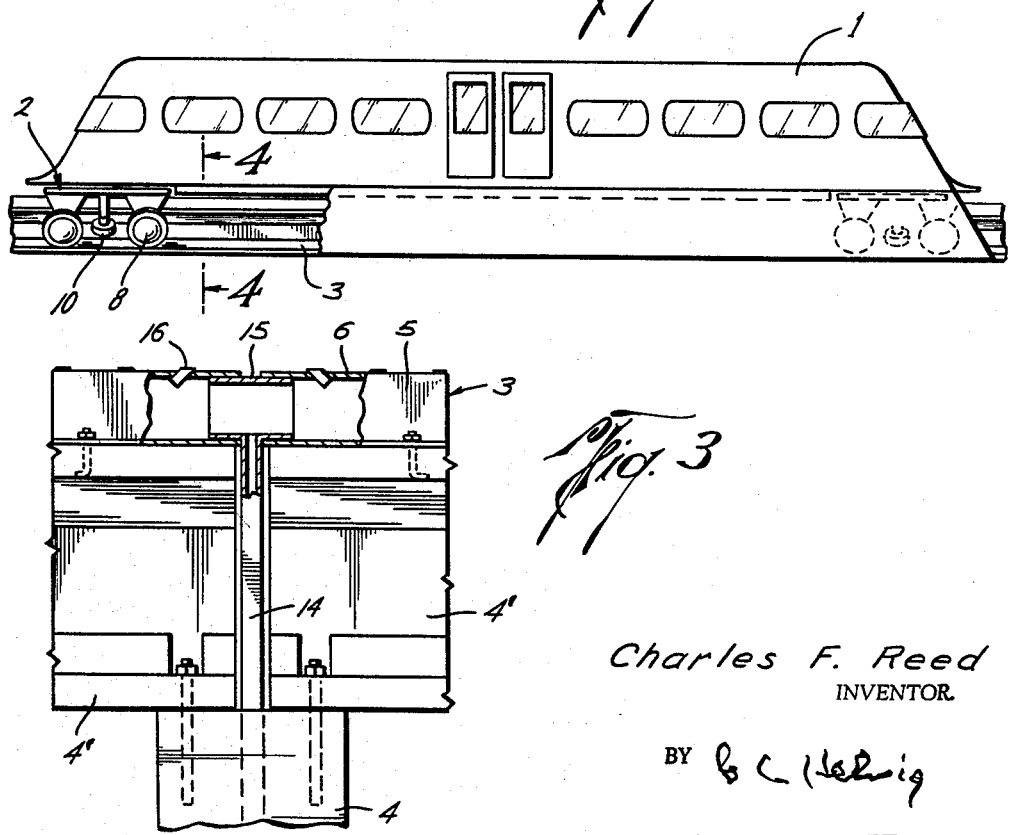
Charles F. Reed
INVENTOR.
BY [signature]
ATTORNEY Feb. 9, 1965 C. F. REED 3,168,875
JET SUSPENSION
Filed April 18, 1963 3 Sheets-Sheet 2

Charles F. Reed
INVENTOR.

BY
ATTORNEY

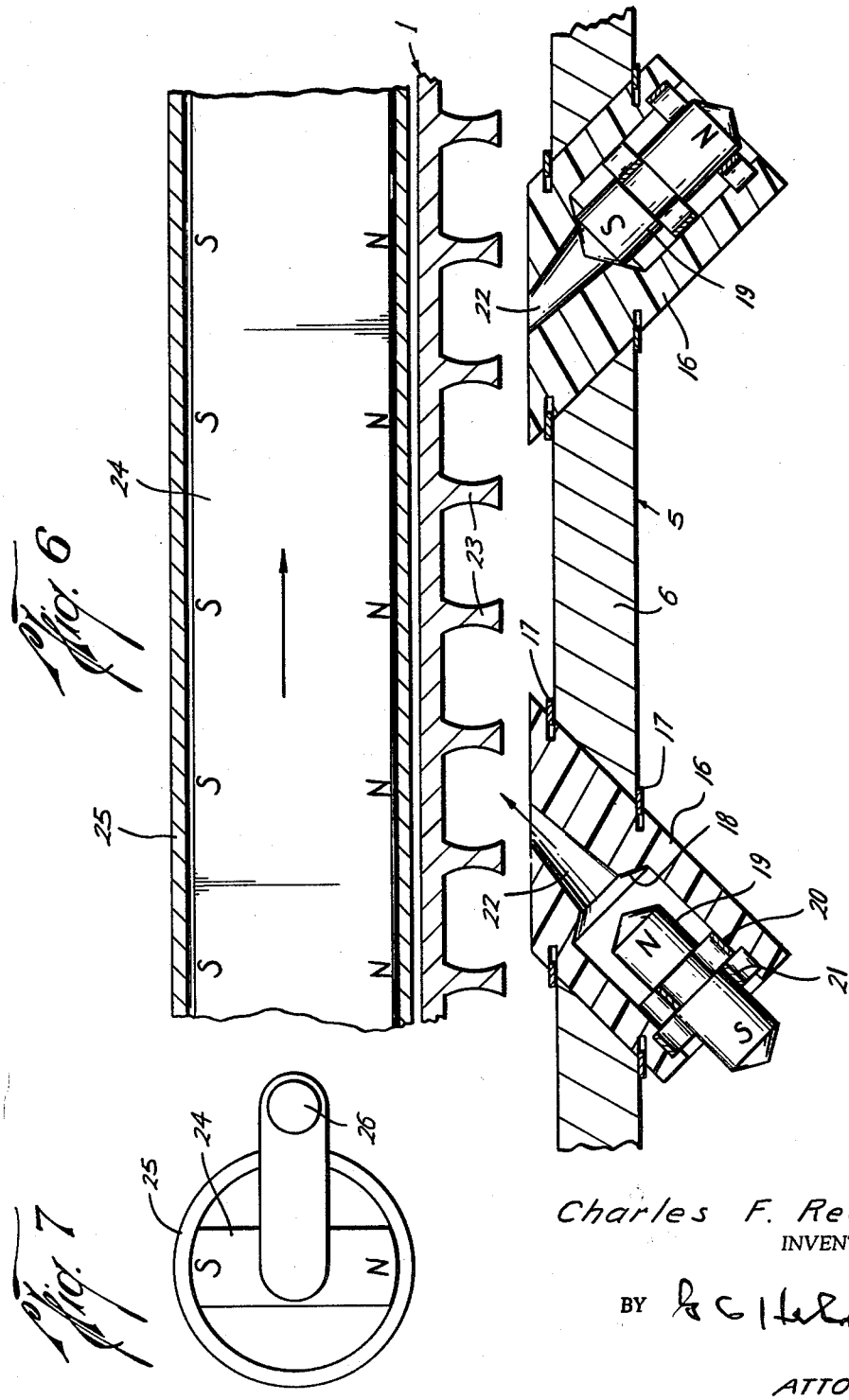

United States Patent Office 3,168,875
Patented Feb. 9, 1965

3,168,875
JET SUSPENSION
Charles F. Reed, 6910 Fannin St., Houston 25, Tex.
Filed Apr. 18, 1963, Ser. No. 273,983
8 Claims. (Cl. 104—134)

This invention relates to the art of pressure fluid suspension for levitation of a body and more particularly to the flotation of a gravity load on a thin film or column of pressure air.

Numerous air cushion supported verhiculer proposals possessing theoretically attractive features have been made and usually involved the support by the vehicle of self-contained mechanisms for downward direction against a fixed surface of a large volume of high pressure air. Utility of self-levitating vehicles is severely handicapped by lack of capability for handling substantial pay load as to be commercially impractical. This is because a disproportionate loading of the vehicle occurs because of the dead weight of the required bulky draft producing assembly including a heavy engine and compressor as well as drive transmission and additional propulsion mechanism.

An object of the present invention is to eliminate entirely the previous handicap and provide a relatively light weight vehicle consisting essentially of a shell enclosing a large loading chamber so that the weight to be transported can consist almost entirely of pay load and without any burden from heavy draft and suspension components and further by providing a ground supported set of pressure fluid jetting orifices and charging means therefor for the direction of fluid streams or columns upwardly against a downwardly facing impingement surface on the mobile body so as to sustain the body near but free of any substantial amount of ground contact.

A further object of the invention is to provide a pressure fluid conductor guide rail for the mobile body having normally closed jetting orifices which open automatically, each in response to the presence adjacent thereto of the mobile body.

A still further object of the invention is to provide for both body suspension and body propulsion through the application of pressure fluid columns directed against body impingement surfaces which are positioned to effectively receive and transmit pressure fluid thrust in opposition to body load and travel resistance.

Another object is to provide for controlled and braking action along a pressure fluid charged guide rail.

Additional objects and advantages will be noted from the following specification taken with the accompanying drawings in which FIG. 1 diagrams in perspective a fragment of a guide rail installation controlling the travel of a mobile body fitted to the rail;

FIG. 2 is a side elevation of a mobile body with parts broken away and on a scale larger than that of FIG. 1;

FIG. 3 is a side elevation with parts in section of a detail of the guide track structure;

FIG. 6 is a longitudinal section along a bottom fragment of the mobile body and the underlying orifice structure as on line 6—6 of FIG. 5; and FIG. 7 is a detail end elevation of the magnet mounting of FIG. 6.

Figure 4:
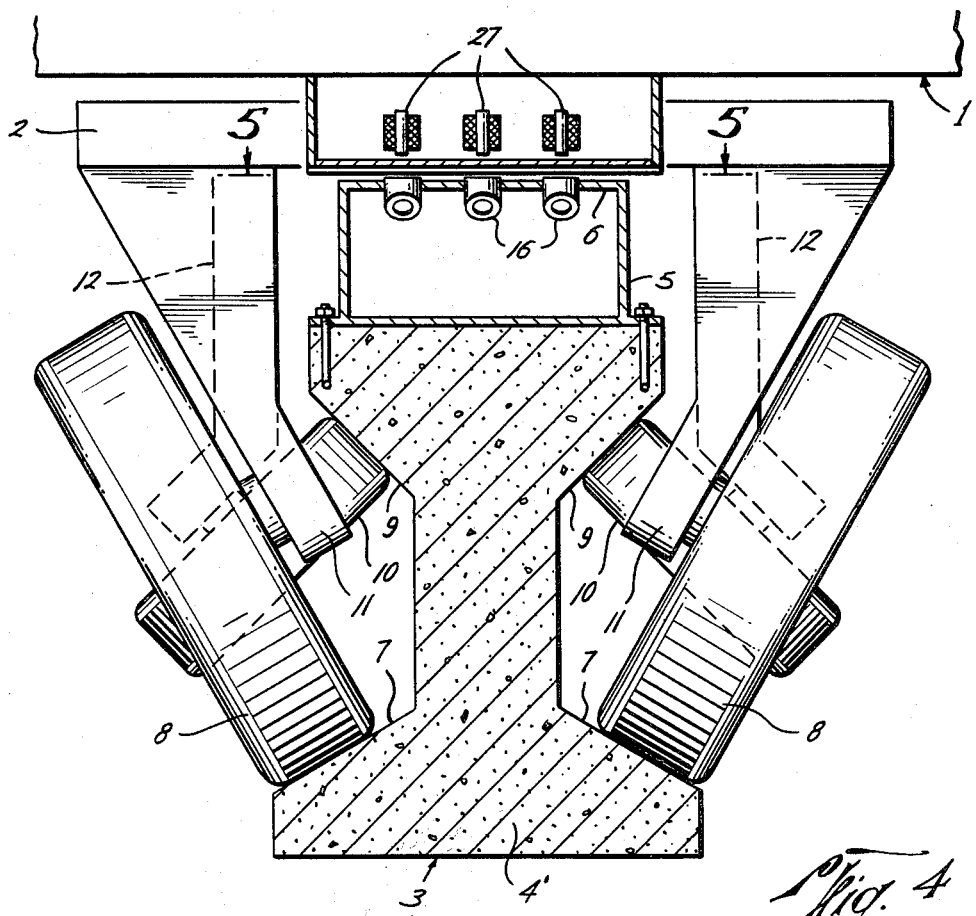
FIG. 4 is a transverse section on line 4—4 of FIG. 2 and on a still larger scale.

For the transportation of pay load, whether by a single car or by cars coupled in a train, there is contemplated the use of a light weight mobile body 1 having an undercarriage 2 engageable for guide and stabilization purposes with a suitable ground supported trackway 3 which extends along a fixed path or right-of-way connecting distant terminals and intermediate station stops. Rail supporting uprights or column standards 4 can be employed for an elevated guide rail installation where dictated by the need to minimize travel interference in congested areas.

For maximum pay loading, the vehicle body 1 is freed of the usual propulsion mechanism and during normal travel the undercarriage 2 is freed from load transmission and merely serves to guide and maintain the body on the trackway 3. Although the undercarriage could be arranged for tracking on multiple rails, it is here shown as comprising front and rear trucks on which the body proper is swiveled vertically and each truck includes transversely spaced apart sets of wheels to run on opposite sides of and to straddle the single track unit which comprises a continuing line of I-beams 4' arranged end to end as a rail assembly which also includes a hollow conduit 5 of nonmagnetic material. The conduit 5 is bolted or otherwise secured above and at longitudinally spaced intervals to the top face of an underlying I-beam and is formed with a flat upper wall 6.

Prestressed concrete girders to rest on and to span the space between the column uprights 4 can be cast to present a pair of downwardly and outwardly inclined tracking surfaces 7—7 facing upwardly on the lower bar of the I-beam 3 for co-operation with the treads of downwardly bearing wheels 8—8 on the undercarriage 2 and also to present a pair of upwardly and outwardly inclined tracking surfaces 9—9 facing downwardly on the upper bar of the I-beam for co-operation with the treads of upwardly bearing wheels 10—10 of the undercarriage 2. The wheel treads may be of suitable solid rubber or other light resilient material and the hubs of the wheels 8—8 rotate on axles mounted by dependent legs 11—11 of the undercarriage so that the wheels on opposite sides of the rails extend in convergent planes at right angles to the tracking surfaces 7—7 respectively. Similarly, the hubs of the wheels 10 rotate on axles carried by dependent legs 12 arranged to have the wheels extend convergently upwardly in planes which bring the wheel treads into proper surface bearing engagement with their co-operating tracking faces 9. For some installations, the downwardly bearing wheels, could be motorized as auxiliary propulsion means at times other than during normal travel and for assisting in overcoming inertia coincident with the start of travel under the action of the principal pressure fluid jetting action. During ordinary travel conditions and with a fluid cushion operative to elevate and support the load carrying body, friction drag at the wheel tread will be negligible or practically nonexistent except for such touch contact as occurs in retaining the vehicle on its guide track.

Compressed air contained within the hollow conduit 5 for ejection in upwardly directed stream against the underside of the mobile body will be the most economical fluid available for maintenance of the air cushion or blanket which transmits body load above the top face 6 and into the guide rail itself. At predetermined intervals along the line of trackway, compressor stations, as seen at 13 in FIG. 1, will deliver pressure air to the interior of the rail conduit 5. FIG. 3 illustrates a supply pipe 14 rising from the compressor station beside one of the uprights 4 and passing between adjoining ends of a pair of girders 4' to connector tube or nipple 15 having its tubular body aligned wth and slidably interconnecting and forming an expansion joint between adjacent ends of two sections of the conduit 5. Under suitable control, a group of normally closed jetting orifices in the top wall 6 of the conduit can be opened selectively beneath the mobile body for the emission of pressure air from the charged conduit 5 and in an upward direction against the underside of the body as a lifting and load suspension force.

Each such jetting orifice is here illustrated in FIG. 6 as comprising a tubular insert 16 having a sealed fit within and projecting through an opening in the top conduit wall 6 and being held therein by top and bottom snap rings 17—17. This insert body 16 is preferably a molded plastic material which is tough and resistant to wire drawing action of onrushing pressure air. An axial passage through the hollow insert includes an intermediate shoulder 18 affording a seat against which a shiftable bolt element 19 will close under outward push thereon from pressure air confined within the conduit. A thin spring metal strip 20 has a small radius central portion received with a latching fit within an annular groove at an intermediate neck of the shiftable bolt or valve element 19 and has a larger radius portion in sliding and guiding bearing on the insert wall at a large diameter portion of the passageway upstream of the valve seat 18. A somewhat similar spring metal strip 21 has its large diameter portion snapped into a locking recess in the wall of the insert and an inwardly projected smaller radius portion extends in blocking relation to and affords a retainer and stop limit for abutment by the guide strip 20 of the shiftable element. Downstream or upwardly of the valve seat 18, the discharge or jetting orifice passageway 22 is of upwardly tapered diameter for advantageously increasing velocity of the outrushing air. By magnetizing the shiftable valve element 19 so that its upstream and downstream ends are of opposite polarity coupled with the mounting of the insert on an axis transversely of the longitudinal extent of the guide rail and by providing a magnetic field to protrude downwardly from the mobile body and into the region of field protrusion from the shiftable permanent magnet, the shiftable element will be influenced either toward or away from its seat 18. More particularly, the shiftable and permanently magnetized valve will be repelled if its outermost pole is like the body carried field pole which is nearest to the valve and the force will be sufficient to overcome the seating force from confined air pressure so that the valve will open the orifice for the issuance therefrom of an upwardly directed jet stream. Each orifice will be opened only when and so long as it is beneath the body and receives a repelling force but at all other times will be closed.

Figure 5:
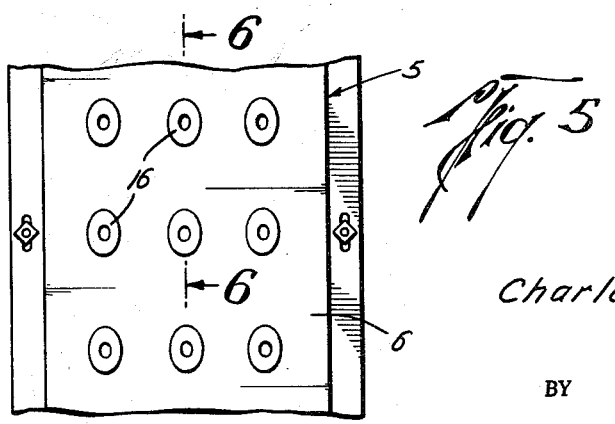
FIG. 5 is a plan view looking down on the top face of the guide rail assembly and on line 5—5 of FIG. 4.

The number of orifices to be employed and their relative spacing location will depend on various factors of load and pressures. FIG. 5 shows a convenient grouping of jet orifices in longitudinal and transverse rows. FIG. 6 shows the underside of a mobile body as having a longitudinal succession of transversely extending and downwardly facing troughs or channels defined by a group of longitudinally spaced transverse webs or blades 23 whose oppositely disposed vertical faces along with the horizontal undersurfaces of the channels afford impingement areas for co-operation and response to pressure air streams jetted from the valved orifices of the hollow conduit 5. For body elevation and propulsion toward the right in FIG. 6, the orifices seen on the left-hand side and those like it will be set in the wall 6 to direct pressure streams upwardly and forwardly of the body travel direction. A forty-five degree angle of jet inclination will be effective although other angles of course can be chosen. For an installation in which body travel in both directions is desired, then another set of oppositely inclined orifices, such as the orifice shown at the right of FIG. 6, will be provided.

For valve actuation, each shiftable element 19, as before indicated, is a permanent bar magnet with its top and bottom ends of opposite polarity as indicated by the letters "N" and "S" in FIG. 6. When the orifices are in two groups, the valves will be magnetized so that the north poles of one group will be outermost and the south poles of the magnets of the other group will be outermost. Therefore, an overlying magnet whose north pole is nearest any orifice valve will unseat the same if the north pole is the valve is outermost and similarly a body carried magnet whose south pole is near any south pole of an orifice valve will repel the shiftable valve to open position. For illustrative purposes, FIG. 6 shows a permanent magnet 24 constituted by a longitudinally extending bar running throughout the length of the mobile body directly above the orifice valving in the rail conduit. North and south poles of the long magnet 24 are spaced apart transversely of the bar. For convenience of disclosure, this bar can be understood to involve an assembly of successively connected and transversely extending bar magnets each of which has like ends of like polarity. This longitudinal bar assembly has its transversely opposite ends in slide engagement with the interior surface of an annular mounting tube 25 and at one end, as seen in FIG. 7, the bar is shown as provided with an operating handle 26 by which the bar can be oscillated within its housing 25 of nonmagnetic material. Thus, in the one position of oscillation as seen in FIG. 6, the north pole of the magnet 24 is nearest the pressure charged conduit 5 and will repel the north or like poles of those valves within the influence of the permanent magnet 24. A half turn of the bar 24 will bring its south pole end into position to influence those valves whose south poles are outermost and within the influence of the magnet 24. Oscillatory adjustment of the permanent magnet through less than one hundred eighty degrees will decrease the influence of its magnetic field on the valves to an extent which may approach a balancing of magnetic and pneumatic forces for a delicate positioning of the valves relative to their seats whereby control can be exercised on pneumatic force being applied for varying forward speed of the vehicle and also for obtaining a braking action in opposition to body inertia by a reversal of pressure forces whereby air may be jetted in a direction opposite to body travel.

Instead of a permanent and oscillatory bar magnet as just described in connection with FIG. 6, a series of electromagnets 27, as in FIG. 4, can be carried by the body in position and for energization to attract or repel orifice valves or selective ones of the valves in controlling elevation and the rate of propulsion of the mobile body.

A mass transportation vehicle to carry up to seventy-five passengers can be fabricated of light but strong structural components to have an aggregate weight of approximately sixty thousand pounds. For a safety margin, calculations based on one hundred thousand pounds have been made, with a determination that the air conduit 5 have a top wall which is eighteen inches wide and an opposing five hundred inches long car underside bearing surface. This provides a nine thousand square inch lifting surface exposed to an interviewing air blanket exerting eleven pounds per square inch to levitate a one hundred thousand pound vehicle. The required eleven pounds per square inch is a vertical force and with the jet delivery nozzle inclined at forty-five degrees, the applied force of the jetted air streams should equal fifteen and one-half pounds per square inch for static lift requirements.

With three orifices in each transverse row as shown in the drawing, a longitudinal spacing of two and one-half inches apart and with half of the orifices beneath the vehicle in their open position for jetting fluid streams, there will be a total of three hundred open orifices acting against a five hundred inch car for a total of fifteen square inches of orifice openings at any given moment. Even distribution of equal-size orifices will provide uniformity of jetted force which, among other things, insures stabilization and a relatively thin air cushion on which the body floats for substantially freeing the wheels of load transmission during travel. Pressure air leaves the conduit during vehicle travel at constantly changing portions along the length traversed and there will be no great pressure differentials throughout the conduit.

Pressure air directed by the vertically tilted nozzles against the vertically disposed impingement surfaces of the body affords both thrust and lift. When half of the valved orifices project in one direction opposite to the remaining half of the orifices, the polarity of the permanently magnetized valve elements 19 will be opposite to one another in adjacent longitudinally spaced apart orifices. Thus, as seen in FIG. 6, one valve has its north pole outermost of the direction of valve travel and the other has its south pole outermost. In this manner, one set of valves will be held closed during travel in one direction while those valves of the other set being instantly traversed will be open inasmuch as fields of like polarity will depress the valves. Car travel in the other direction can be effected by rotation of the bar magnet 24 to a position one hundred eighty degrees from the previous setting and the action of the valves will be as previously described with the exception that the actuation of the valves will occur in the sets which previously were inactive.

From the foregoing it will be seen that there has been provided an effective and simple way for moving a body on an air cushion but with the heavy operating mechanism supported directly on the ground in order that the mobile body is available for carrying a large pay load.

What is claimed is:

1. In combination, a hollow guide rail, ground supported means locating the rail in a fixed path, a mobile body having a rail tracking formation in coactive relation with the guide rail for guiding travel of the mobile body, pressure fluid supply means in communication with the interior of the hollow guide rail to charge the same with fluid under pressure, said rail throughout its length having fluid jetting orifices extended therethrough in directions to emit pressure fluid toward said body as a load sustaining fluid cushion, normally closed orifice valving means actuatable to open any particular orifice in response to the presence adjacent thereto of said mobile body, actuating means for said valving means, said actuating means including magnet means carried by the body to present a magnetic field projected transversely thereof and along the rail and said valving means including magnetic field influenced shiftable elements fitted to the jetting orifices and responsive to pressure fluid within the rail to close such orifices and responsive to the influence of said magnetic field when the body is in traversing relation thereto to open such orifices.

2. In the combination as defined in claim 1 wherein said magnet means comprises electromagnet means having poles spaced apart transversely of the direction of body travel and wherein said shiftable elements include permanent magnets having their opposite poles spaced apart transversely of the longitudinal direction of the rail, the magnet poles which are transversely outermost being of a polarity in relation to said magnetic field to be repelled when within the influence thereof.

3. In the combination defined in claim 1 wherein the magnet means comprises permanent magnet means and wherein said shiftable elements include permanent magnets whose poles which are farther downstream of the fluid flow direction through the orifices are of opposite polarity to the nearest thereto of the pole portions of said permanent magnet means so as to be repelled for opening the orifices when within the influence of said permanent magnet means.

4. In combination, a hollow guide rail, ground supported means locating the rail in a fixed path, a mobile body having a rail tracking formation in coactive relation with the guide rail for guiding travel of the mobile body, pressure fluid supply means in communication with the interior of the hollow guide rail to charge the same with fluid under pressure, said rail throughout its length having fluid jetting orifices extended therethrough in directions to emit pressure fluid toward an impingement portion of said body as a load sustaining fluid cushion, said orifices being arranged to emit pressure fluid in directions inclined to planes tranverse to the path of the rail and also being arranged in two groups, in one of which the orifices emit pressure fluid in directions oppositely inclined to the inclined directions of pressure fluid emitted by the orifices of the other group, orifice controlling valves responsive to the action thereon of the charge of pressure fluid within the rail to close the orifices and each valve including a permanent magnet whose opposite poles are spaced apart tranversely of the direction of body travel, the magnet poles which are outermost in the downstream flow direction of the orifices in one group being of polarity opposite the poles which are outermost in the downstream flow direction of the orifices in the other group, said impingement portion of the body including a longitudinal succession of transverse and oppositely facing pressure fluid impingement surfaces, permanent magnet means rotatably mounted by the body on an axis longitudinally thereof and having opposite polarity poles spaced apart transversely of said axis and means to rotate the permanent magnet means about said axis to present said opposite poles selectively within the fields of the magnets of the valves in either of the two groups of orifices and thereby supply magnetic force to open the valves of the selected group.

5. In combination, a hollow guide rail, ground supported means locating the rail in a fixed path, a mobile body having a rail tracking formation in coactive relation with the guide rail for guiding travel of the mobile body, pressure fluid supply means in communication with the interior of the hollow guide rail to charge the same with fluid under pressure, said rail throughout its length having fluid jetting orifices extended therethrough in directions to emit pressure fluid toward an impingement portion of said body as a load sustaining fluid cushion, said orifices being arranged to emit pressure fluid in directions inclined to planes transverse to the path of the rail and also being arranged in two groups, in one of which the orifices emit pressure fluid in directions oppositely inclined to the inclined directions of pressure fluid emitted by the orifices of the other group, said impingement portion of the body including a longitudinal succession of oppositely facing pressure fluid impingement surfaces occupying planes transverse to the longitudinal direction of body travel for effecting body propulsion under the jetted force of said pressure fluid on said surfaces, electromagnetic means carried by the body and which upon energization projects flux along the adjacent rail portion, selector means for energizing said electromagnetic means to provide flux of either of opposite polarities and normally closed valving for the orifices of both groups including field responsive opening means for the valving of the orifices of one group when under the influence of the flux of one polarity and field responsive opening means for the valving of the orifices of the other group when under influence of the flux of the other polarity.

6. In combination, a hollow guide rail, ground supported means locating the rail in a fixed path, a mobile body having a rail tracking formation in coactive relation with the guide rail for guiding travel of the mobile body, pressure fluid supply means in communication with the interior of the hollow guide rail to charge the same with fluid under pressure, said rail throughout its length having fluid jetting orifices extended therethrough in directions to emit pressure fluid in directions inclined to planes transverse to the path of the rail and also being arranged in two groups, in one of which the orifices emit pressure fluid in directions oppositely inclined to the inclined directions of pressure fluid emitted by the orifices of the other group, said formation on the body including a longitudinal succession of oppositely facing pressure fluid impingement surfaces occupying planes transverse to the longitudinal direction of body travel for effecting body propulsion under the force of pressure fluid on said surfaces, normally closed valves for said orifices, actuators for opening said valves comprising permanent magnets having their opposite poles spaced apart transversely of the rail and with the north poles of the magnets for the one group of orifices being positioned outermost and with the south poles of the group of other orifices being positioned outermost and magnetic flux projecting means carried by the body and means to selectively project magnetic flux in either of opposite directions along the rail for valve actuator response in one instance by repelling the magnets having their north poles outermost and in the other instance by repelling the magnets having their south poles outermost.

7. A pneumatic levitation system for floating a body in travel on an air cushion, comprising a plurality of upwardly directed pressure air jetting devices mounted in fixed relation throughout the travel region to be traversed by the body, pressure air supply means communicating with said jetting devices, normally closed valve means for each jetting device, each such valve means including a pair of complementary valve seating surfaces engageable and disengageable one with another for controlling pressure air emission by the jetting device and a movably mounted permanent magnet joined with one of said seating surfaces and actuatable to move said one seating surface out of engagement with the other seating surface, a body superposed in traversing relation to the jetting device and presenting the body underside for impingement thereon of pressure air emitted by the upwardly directed jetting devices, and magnetic field means carried by the body to project its magnetic field into influencing relation with and of direction opposing the field of each permanent magnet instantly beneath said field means and thereby actuate the magnet in movement to disengage said seating surfaces, said pressure air supply means supplying air at an elevated pressure level sufficient to provide a load floating air cushion beneath said body underside of magnitude related to the weight of the body to maintain said body in air borne suspension.

8. A pneumatic levitation system for floating a body in travel on an air cushion, comprising a plurality of upwardly directed pressure air jetting devices mounted in fixed relation throughout the travel region to be traversed by the body, pressure air supply means communicating with said jetting devices, valve means for each jetting device, each valve means having a jet opening position and a jet closing position and including a permanent magnet having its opposite poles spaced apart in a direction transverse to body travel direction and being shiftable toward valve closing position in response to action thereon of pressure air from said supply means, a body superposed above and in traversing relation to said jetting devices magnetic field means carried by said body and projecting its field downwardly into influencing relation with the permanent magnets of the valve means instantly beneath the body and active on said permanent magnets to shift them toward valve opening positions, said pressure air supply means supplying air at an elevated pressure level sufficient to provide a load floating air cushion beneath said body underside of magnitude related to the weight of the body to maintain said body in air borne suspension.

References Cited by the Examiner

UNITED STATES PATENTS

| 319,335 | 6/85 | Smith | 104—155 |
| 2,493,013 | 1/50 | Nelson | 104—155 X |
| 2,953,864 | 9/60 | Taylor | 105—153 X |
| 2,971,473 | 2/61 | Raynaud | 104—134 |
| 3,017,838 | 1/62 | Bingham | 104—120 |
| 3,090,327 | 5/63 | Crowley | 104—134 |
| 3,096,728 | 7/63 | Amann et al. | 104—134 |

LEO QUACKENBUSH, *Primary Examiner.*